(12) United States Patent
Gutierrez et al.

(10) Patent No.: US 6,193,433 B1
(45) Date of Patent: Feb. 27, 2001

(54) COMPENSATING ELEMENT FOR A PULLING AND PRESSING ROD

(75) Inventors: Carmelo Gutierrez; Reiner Moritz, both of Ehringshausen; Willi Henrich, Ehringshausen-Katzenfurt, all of (DE)

(73) Assignee: Kuster & Co. GmbH, Ehringshausen (DE)

( * ) Notice: Subject to any disclaimer, the term of this patent is extended or adjusted under 35 U.S.C. 154(b) by 0 days.

(21) Appl. No.: 09/043,448

(22) PCT Filed: Jul. 30, 1997

(86) PCT No.: PCT/EP97/04131
    § 371 Date: Mar. 20, 1998
    § 102(e) Date: Mar. 20, 1998

(87) PCT Pub. No.: WO98/04843
    PCT Pub. Date: Feb. 5, 1998

(30) Foreign Application Priority Data

Jul. 30, 1996 (DE) ............................................. 196 30 585
Feb. 4, 1997 (DE) ............................................. 197 04 053

(51) Int. Cl.[7] ............................................. B25G 3/20
(52) U.S. Cl. ...................... 403/325; 403/321; 403/109.1; 403/374.1; 74/531
(58) Field of Search ............................. 74/531; 403/321, 403/322.1, 322.4, 325, 109.1, 109.8, 110, 374.1, 368

(56) References Cited

U.S. PATENT DOCUMENTS

| | | | |
|---|---|---|---|
| 2,330,443 | * 9/1943 | Horton | 74/531 X |
| 2,690,918 | * 10/1954 | Holte | 403/321 |
| 2,915,903 | * 12/1959 | Digby et al. | 403/325 |
| 3,078,112 | * 2/1963 | Mathey | 403/300 X |
| 3,091,749 | * 5/1963 | Felts | 403/300 X |
| 3,220,743 | * 11/1965 | Knapp | 403/368 |
| 3,643,765 | * 2/1972 | Hanchen | 74/531 X |
| 3,703,748 | * 11/1972 | Kelly | 403/368 |
| 3,912,411 | * 10/1975 | Moffat | 403/322.1 |
| 4,793,206 | 12/1988 | Suzuki . | |
| 4,829,845 | 5/1989 | Suzuki . | |
| 5,492,430 | * 2/1996 | Jones | 403/325 |

FOREIGN PATENT DOCUMENTS

| | | |
|---|---|---|
| 3533405 | 3/1987 | (DE) . |
| 4336221 | 5/1994 | (DE) . |
| 196 18 422 | 5/1997 | (DE) . |
| 0 743 463 | 11/1996 | (EP) . |

* cited by examiner

Primary Examiner—Lynne H. Browne
Assistant Examiner—David E. Bochna
(74) Attorney, Agent, or Firm—Liniak, Berenato, Longacre & White (57) ABSTRACT

An adjusting device for a push-pull rod (1) such as is used in motor vehicles between the gearshift lever and the transmission. To achieve continuous length compensation, the invention uses a spring (4) to directly or indirectly effect clamping between the push-pull rod (1) and the housing of the adjusting device or a connector (6).

3 Claims, 8 Drawing Sheets

COMPENSATING ELEMENT FOR A PULLING AND PRESSING ROD

BACKGROUND OF THE INVENTION a) Field of the Invention

The invention relates to an adjusting device for a push-pull rod, in particular to adjust length changes for the push-pull rod in continuous manner.

b) Description of Related Art

Such push-pull rods are used for instance in motor-vehicle transmissions to select and shift gears. In general a drive cable is connected to the push-pull rod and itself leads to a corresponding drive means, for instance a selecting or shifting lever or to the transmission. In order to adjust the length, for instance to compensate for tolerances, it is known with respect to such push-pull rods to adjust the rod's length in steps using a gear and mating gear and additional locking/unlocking elements. This design entails the drawback that adjustment can be carried out only stepwise, i.e., that intermediate positions are precluded. Another drawback of the known push-pull rods is the necessity to deliver them to the site of installation, for instance the assembly line of the automobile manufacturer, assembled to the drive cable. Thereby the drive cable is preset, and as a result most of the time the assembly-line worker must readjust to the precisely required length. Such a procedure frequently incurs substantial labor (unlocking the locking elements, adjusting, closing the locking elements).

SUMMARY OF THE INVENTION

It is the object of the present invention to create an adjusting device for a push-pull rod that overcomes the above cited drawbacks.

These problems are solved in the present invention by an adjusting device assembled in or at the push-pull rod and which directly or indirectly effects clamping between the push-pull rod and the adjusting-device housing or an affixation means.

The clamping, implemented in the invention by a spring, allows, when the spring is compressed, easy insertion of the push-pull rod to the desired depth and, upon releasing the spring, to reliably achieve secure positioning of the adjusting device on the push-pull rod. In this manner, the depth of insertion, i.e. the length adjustment of the cable of the push-pull rod, is reliably kept in the desired position. Using only one hand, the fitter is able to open the adjusting device of the invention, and the insertion of the push-pull rod is carried out with the other hand. In the proper setting, the desired length can be fixed in position by unlocking, by removing a securing means or by releasing the prestressed spring.

In a first embodiment, the adjusting device comprises within its housing a spring-loaded locking bush cooperating by its inside surface with a setting element affixable to the push-pull rod. In this design the locking bush clamps the setting element by spring force and as a result the setting element is irrotational. For the same reason the length of the adjusting device remains constant whether loaded tensively or compressively.

In a preferred embodiment, the inside surface of the locking bush and the cooperating outside surface of the setting element are each conical. The spring presses the conical locking bush against the conical outside surface of the setting element and in this manner reliably prevents said element from rotating. Once the setting element in turn keeps the push-pull rod in the desired position, for instance by screw-tightening, a change in the total length of the component by push or pull no longer is possible. The clamping effect between the locking bush and the setting element can be implemented by ordinary friction between two metal surfaces, by specially matched materials, by fluting, roughening and also for insance non-circular, for instance hexagonal, octagonal or other polygonal designs. It is clear furthermore that the cooperating parts also may be composed of plastic, ceramics or the like.

In a preferred embodiment, the setting element is a setting nut threaded on its inside and cooperating with a thread on the push-pull rod. The threads are made non-interlocking in order that the fitter can easily displace the push-pull rod relative to the setting nut.

In another embodiment, a helical screw is present in the housing with the push-pull rod passing through its inside. The clamping of the invention of the push-pull rod in the adjusting device takes place in that the inside diameter of the unstressed spring is less than the outside diameter of the push-pull rod, or in that the spring forces an element located between it and the push-pull rod on latter. The spring is bent for instance by rotation about its own axis to allow insertion of the push-pull rod. Thereby the spring enlarges its inside diameter and permits inserting the push-pull rod. When the spring is released, it again reduces its diameter and clamps the push-pull rod in position.

Besides the clamping effect of the helical spring, the adjusting device also may comprise one or more clamping elements fitted with ride-on bevels or rest surfaces facing the helical spring.

In a preferred embodiment the push-pull rod is held in place directly by the spring having the smaller inside diameter. If the rod is tensively or compressively loaded, then the spring will be pressed against the ride-on bevels of the clamping elements and as a result the particular spring coil diameter is further reduced In this manner the clamping effect of the adjusting device of the invention is increased even further.

A setting piece may be provided to more easily spread apart the spring, said piece being rigidly joined to the spring or to its ends and extending outward. The fitter is able to easily rotate the setting piece relative to the housing, for instance using the thumb of his hand holding said housing, and then he may insert the push-pull rod to the appropriate length. After the end of the setting procedure, the spring encloses or compresses the push-pull rod which it retains in this intended position and thereby the full drive element is kept at the desired length.

In a further embodiment, spring-loaded clamping elements are present in the housing and comprise conical surfaces (for instance outer surfaces) cooperating in such manner with one or two opposite, for instance inwardly conical, seats in such manner that the push-pull rod inserted in it is clamped in place directly or indirectly. In this design the spring presses conical elements into conical mating surfaces and illustratively a radial clamping force is then exerted by diameter reduction, leading to reliable affixation of the push-pull rod. The adjusting device of the invention may comprise a conical clamping element forced by a spring into a recess, or two clamping elements may be present which are forced by the spring into opposite directions and thereby into two mutually opposite conical recesses. This design offers reliable positional affixation for both tensile and compressive load. Illustratively the clamping elements may comprise a slot to reduce their diameter when being clamped and thereby exerting compression on the push-pull rod, or they may transfer the clamping effect directly or indirectly to the push-pull rod.

The indirect transmission takes place for instance using rollers or balls forced during shifting by the conical recesses against the push-pull rod and thereby automatically increasing clamping.

A securing means may be provided for easy assembly to keep the spring generating the compression in the compressed state in the unassembled state, whereby the clamping elements do not cooperate with the recesses and consequently the push-pull rod can be easily inserted. Once the push-pull rod has been moved into the desired position, the fitter need do no more than remove the securing means. As a result the spring is released and forces the clamping elements against the seats, achieving reliable setting of the push-pull rod to the desired length. The securing means may be in the form of a disposable splint discarded following assembly, or it may be an operating element remaining at the adjusting device to allow easy access to the spring for subsequent readjustments in order to compress said spring and render the push-pull rod displaceable relative to the recess.

The invention offers further ease of mounting by providing stops for the adjusting device at a position of axial displacement of the push-pull rod and/or means for automatically securing the push-pull rod in a set position. In one embodiment of the invention said means may comprise a spring-loaded securing sleeve which, in a first position, makes possible adjusting the push-pull rod and, when arriving in a second position, automatically implements stopping the push-pull rod by means of the spring force, the securing sleeve optionally being fitted with a control slot cooperating with a cam of the housing to affix the securing sleeve in the first position.

Further purposes, advantages, features and applications of the present invention are elucidated in the following description of the embodiments and in relation to the drawing. All described and/or graphically shown features per se or in arbitrary appropriate combination represent the object of the present invention.

DETAILED DESCRIPTION OF THE PREFERRED EMBODIMENTS

Figure 1:
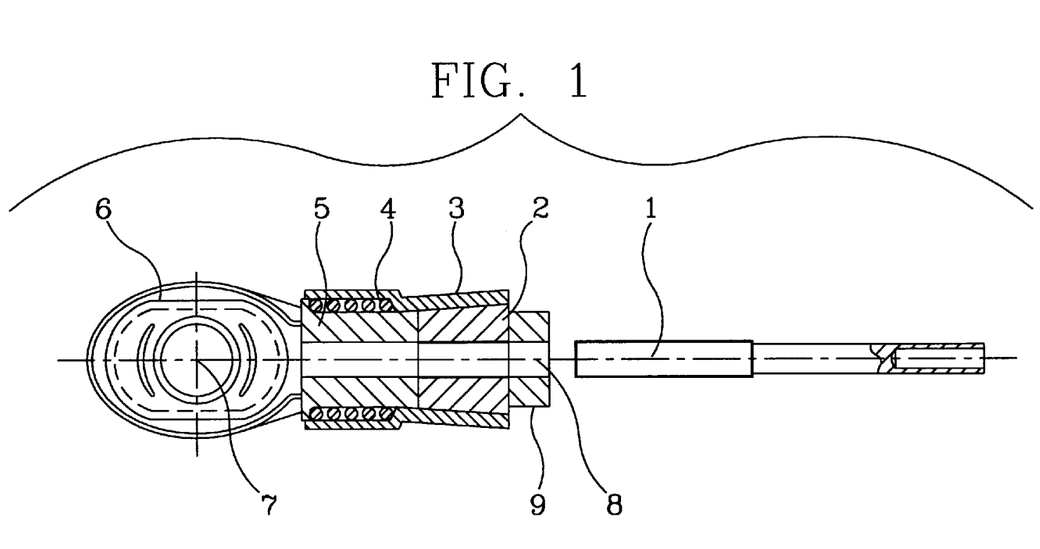
FIG. 1 shows a first embodiment of an adjusting device according to the present invention as the device is being assembled.

As shown in FIG. 1, the adjusting device of the invention comprises a push-pull rod 1, a setting nut 2, a locking bush 3, a spring 4, a seat 5, a connector 6 with clearance 7 and a cage 9. In this and other embodiments, the connector 6 is a coupling means for an automotive transmission. Moreover, in this as well as in other embodiments, the connector 6 may be replaced by an extension means or by a further push-pull rod 1. In this and in other embodiments, the pertinent disclosure is that the adjusting device is located at one end between the push-pull rod 1 and the connector 6 to the part to be driven, in this case for instance directly in front of the connection to an automotive transmission.

Figure 2:
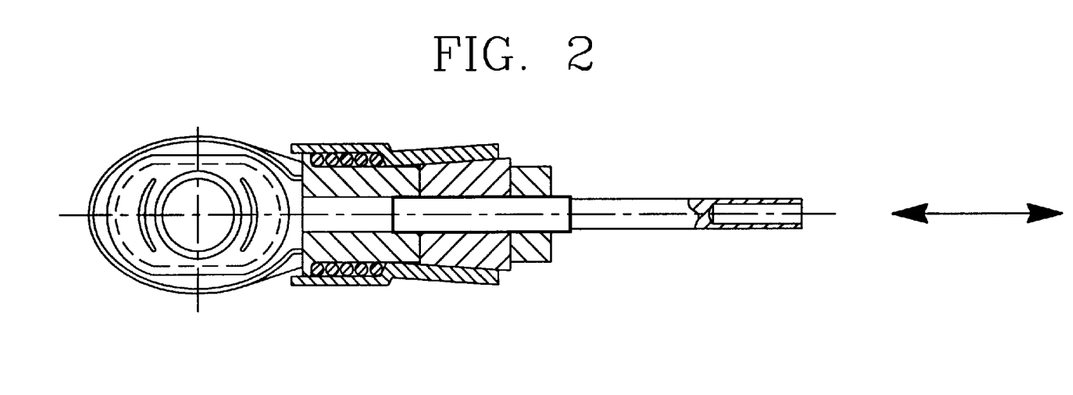
FIG. 2 shows the first embodiment of FIG. 1 with the push-pull rod inserted into the insertion duct.

The connector 6 fitted with the clearance 7 continues in a seat 5 illustratively integral with the connector 6. A threaded connection between the seat 5 and the connector 6 is equally applicable. A setting nut 2 is present in the seat 5 and in this instance is inserted into the cage 9 and is kept in place against axial displacement inside the seat 5. An insertion duct 8 for the push-pull rod 1 runs through the seat 5 and through the setting nut 2. The setting nut 2 comprises a conical outer surface cooperating by means of the locking bush 3 with a conical inside surface corresponding to the outside surface of the setting nut 2. The locking bush 3 is kept in the locked position with the setting nut 2 by a compression spring 4 resting against a collar of the seat 5. Upon inserting the push-pull rod 1 into the duct 8, that is when the push-pull rod 1 shall be moved into the desired position relative to the connector 6, the locking bush 3 will be displaced toward the connector 6 against the force of the spring 4. The setting nut 2 is released thereby. In this design the thread configuration of push-pull rod 1 and setting nut 2 is non-interlocking and while the setting nut 2 is being rotated, the push-pull rod 1 can be inserted inside the seat 5 or held by the cage 9 as schematically shown in FIG. 2.

Accordingly the fitter moves the locking bush 3 against the spring force and thereby the setting nut 2 is now freely rotatable. Next the fitter forces the push-pull rod 1 inward to the desired extent and lets go of the locking bush 3. The spring 4 moves the conical inside surface of the locking bush 3 over the conical outside surface of the setting nut 2 and thereby precludes the setting nut 2 from rotating. A change in insertion depth of the push-pull rod 1 is implemented in this manner in the adjusting device.

Illustratively the thread configuration relating to the pull rod 1 and to the inside borehole of the setting nut 2 may be a multiple thread.

Figure 16:
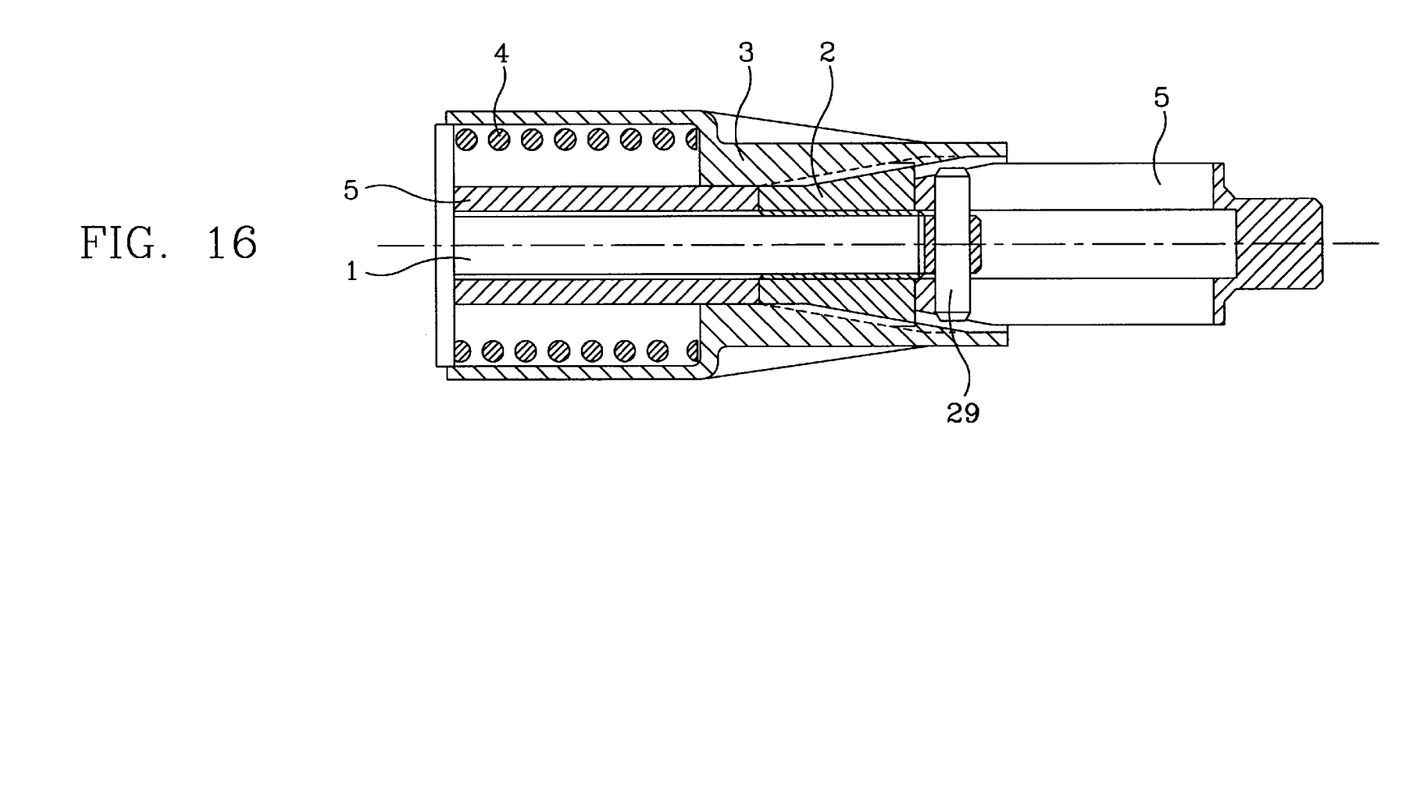
FIG. 16 shows a variation of the first embodiment of FIG. 1 with a rectilinear guide pin.

To prevent rotation of the push-pull rod 1 relative to the connector 6, rectilinear guides may be used between the pull rod 1 and the seat 5. Such guides for instance may be in the form of a pin 2a passing through the push-pull rod 1 and which by its ends projecting from the push-pull rod slides inside mating longitudinal slots inside the seat 5. Other variations of rectilinear guides, i.e. of an anti-rotation system concerning the push-pull rod 1 and the connector 6 are also feasible.

Once the push-pull rod 1 together with drive cable has been adjusted to the desired extent, the locking bush 3 will be forced into and kept by the spring 4 in the locked position on the setting nut 2, so that adjustment has been completed.

FIG. 2 shows the adjusting device of the invention while still in the assembled state wherein the locking bush 3 is pressed against the spring 4, as a result of which the push-pull rod 1 can be freely move to-and-fro and thus the length of the adjusting device is easily selectable. Only after the locldng bush 3 has been let go will the spring 4 move the locking bush 3 against the setting nut 2, thereby preventing rotation of the setting nut 2 and hence relative length change between the seat 5 and the push-pull rod 1. The design of the invention furthermore offers the advantage that optionally the push-pull rod 1 with cable drive can be delivered separately from the connector 6, for instance to the assembly line of an automotive manufacturer. The fitter can continuously adjust the push-pull rod 1 to the desired length.

Figure 3:
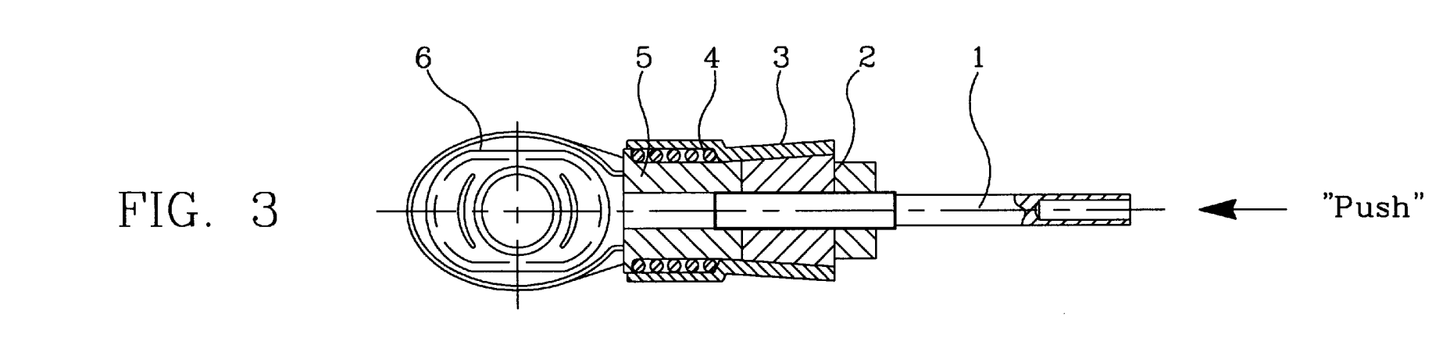
FIG. 3 shows the first embodiment of FIG. 1 with the push-pull rod being compressively loaded.
Figure 4:
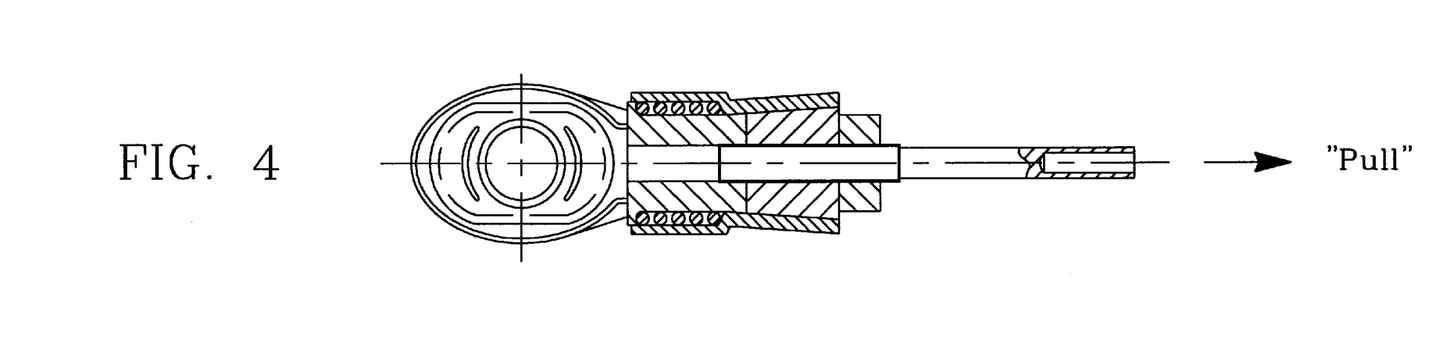
FIG. 4 shows the first embodiment of FIG. 1 with the push-pull rod being tensively loaded.

FIG. 3 shows the adjusting device of the invention being loaded compressively and FIG. 4 being tensively loaded, the rigid coupling of the push-pull rod 1 to adjusting device eliminating any difference.

A further embodiment is shown in FIGS. 5 through 8, wherein the connection means to the automotive transmission or the other means to be driven also is referenced by 6. A tubular housing 10 is connected to the connector 6. Two springs 11 and 12 of which the turns run in opposite directions are present in the housing 10 and between them contain a setting piece 13. The particular inner spring ends are linked to the setting piece 13. The particular outer spring ends are affixed to two clamping elements 14 and 15 irrotationally mounted inside the housing 10. The setting piece 13 comprises a radially outwardly pointing lever or head (not shown in further detail) by means of which the setting piece 13 can be rotated from the outside. The inside diameters of the springs 11 and 12 in their rest positions are less than the diameter of the push-pull rod 1 to be inserted. When rotating the setting piece 13 against the force of the two springs 11 and 12, said springs expand radially outward to allow the push-pull rod 1 being moved through the inside space of the two springs 11 and 12.

Figure 5:
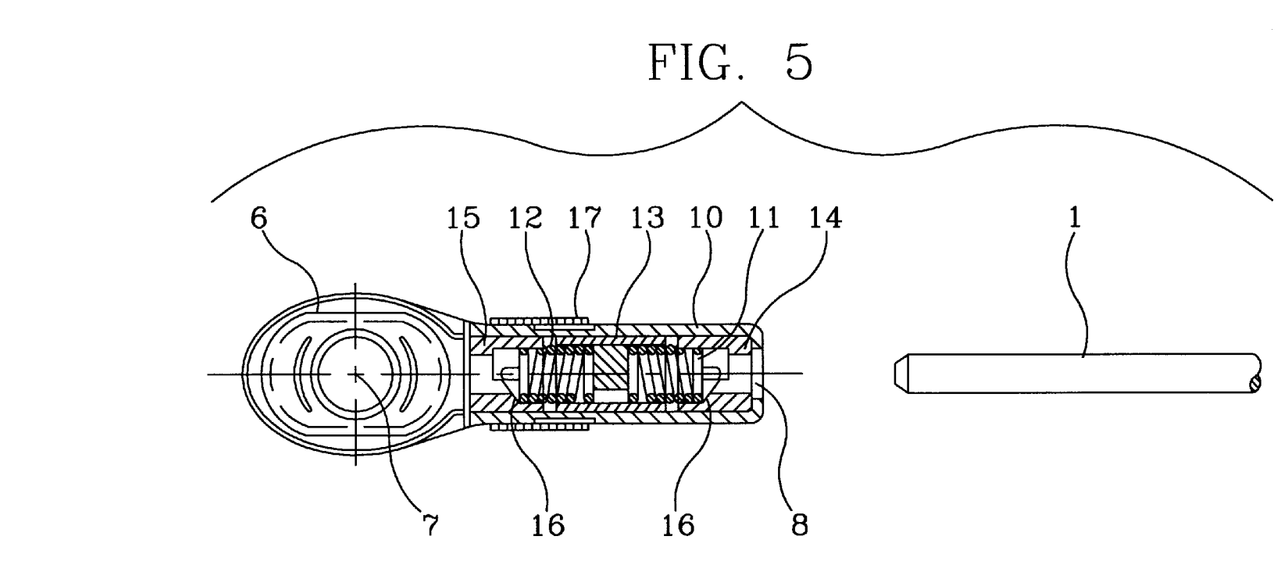
FIG. 5 shows a second embodiment of an adjusting device according to the present invention as the second embodiment is being assembled.
Figure 6:
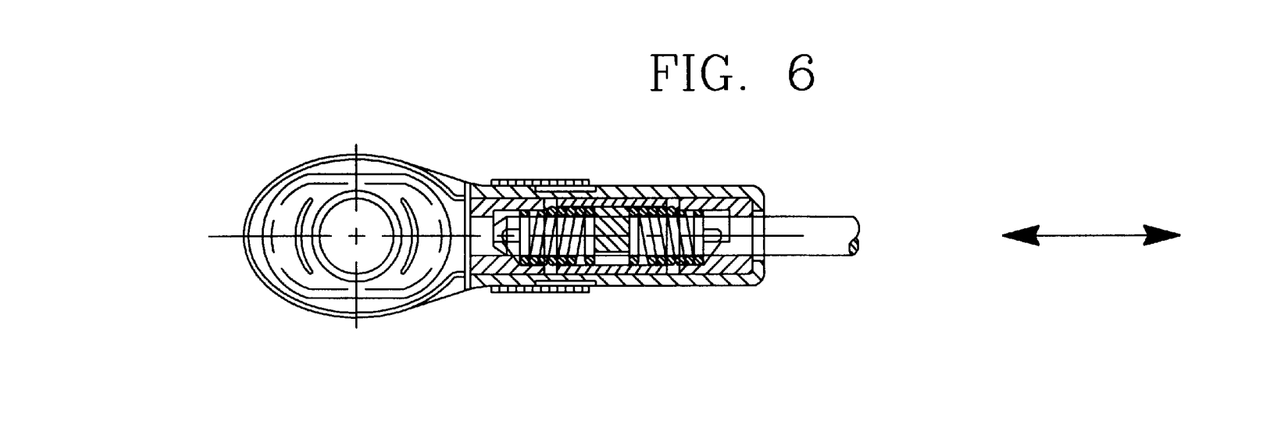
FIG. 6 shows the second embodiment of FIG. 2 with the push-pull rod inserted into the insertion duct.

As regards the delivery-state setting shown in FIG. 5, the adjusting device together with the connector 6 is therefore separate from the push-pull rod 1. The fitter takes the adjusting device and rotates the setting piece 13 about the longitudinal axis of the housing 10, whereby the springs 11 and 12 become wider. Said fitter then can move the push-pull rod 1 into the widened cavity to the desired depth of insertion. Once the length has been set to the desired value, the fitter lets go the setting piece 13 and the springs 11 and 12, on account of the reduction of their inside diameters, clamp the push-pull rod 1 into the desired position.

FIGS. 5 through 8 further show that this design offers an additional feature allowing increasing the clamping force of tensile and compressive loading: ride-on bevels 16 for the ends of the springs 11 and 12 are present at the clamping elements 14 and 15.

Figure 7:
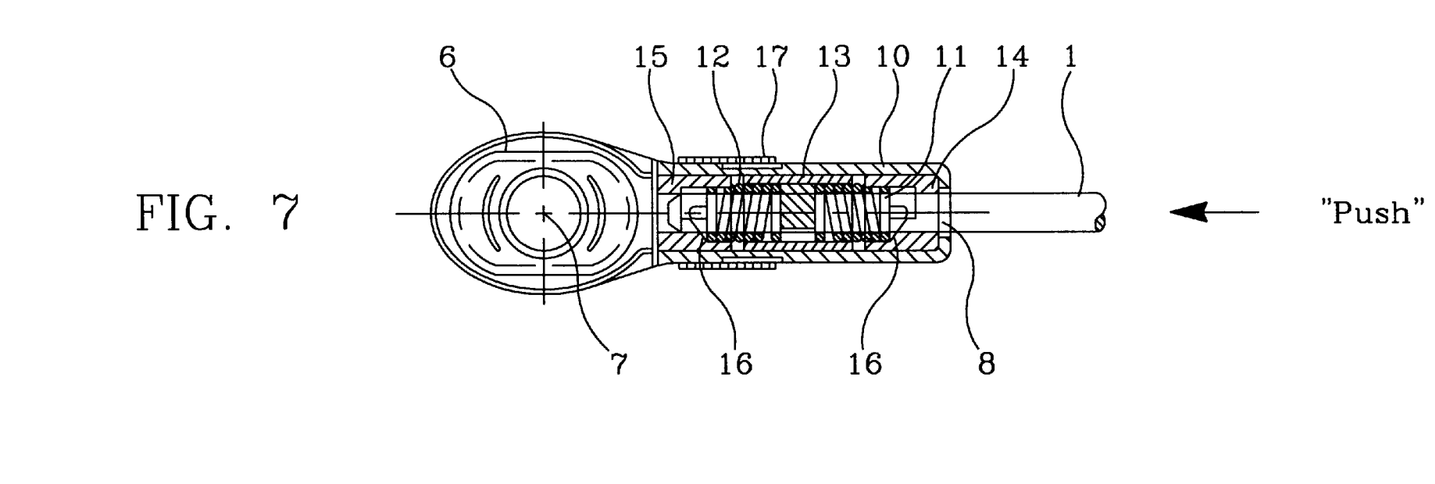
FIG. 7 shows the second embodiment of FIG. 2 with the push-pull rod being compressively loaded.

FIG. 7 shows the reaction of the adjusting device to compressive loading. In this case the spring 12 is pressed against the ride-on bevel 16 and thereby reduces its diameter. Consequently the clamping action of the push-pull rod 1 is increased and it is held in position even more tightly.

Figure 8:
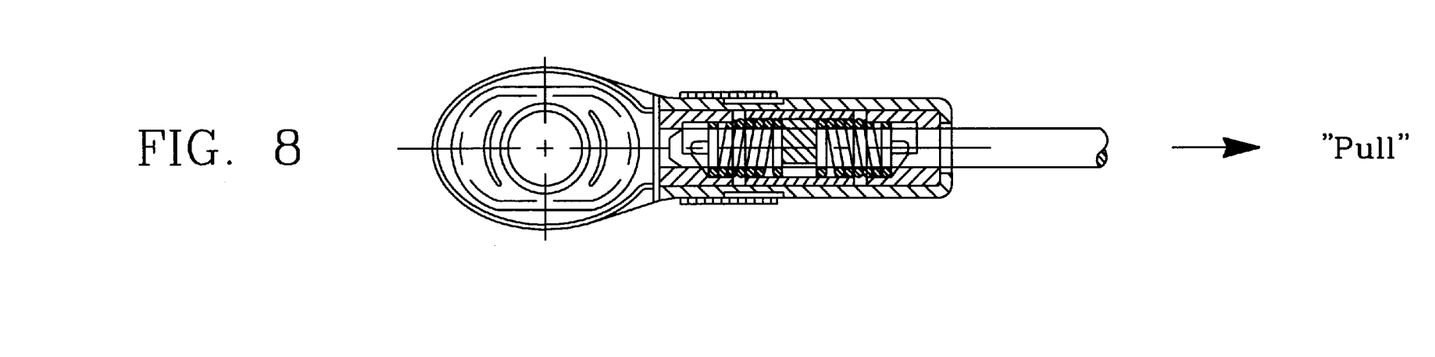
FIG. 8 shows the first embodiment of FIG. 2 with the push-pull rod being tensively loaded.

FIG. 8 shows the effect of tensile loading on the adjusting device, whereby the ride-on bevel 16 at the clamping element 14 causes the associated spring 11 to be pulled against the ride-on bevel 16 and thereby said spring's diameter is reduced to cause increased retention of the push-pull rod 1.

The embodiments of FIGS. 5 through 8 furthermore comprise a securing sleeve 17 to prevent unintended rotation of the setting piece 13 when in its operational position. The other position of the securing sleeve 17 allows rotating the setting piece 13, and therefore, when the springs 11 and 12 are widened, the push-pull rod 1 can be inserted or removed or its position may be altered.

Figure 9:
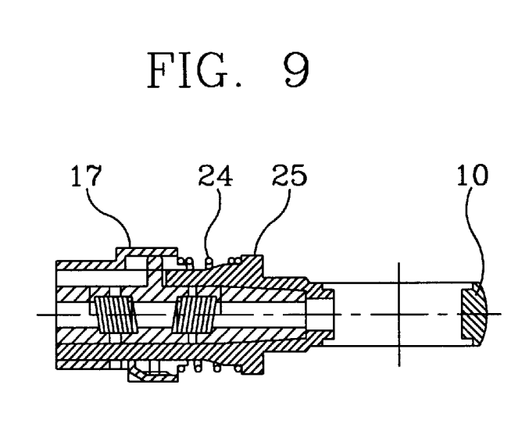
FIG. 9 shows a third embodiment of an adjusting device according to the present invention.
Figure 10:
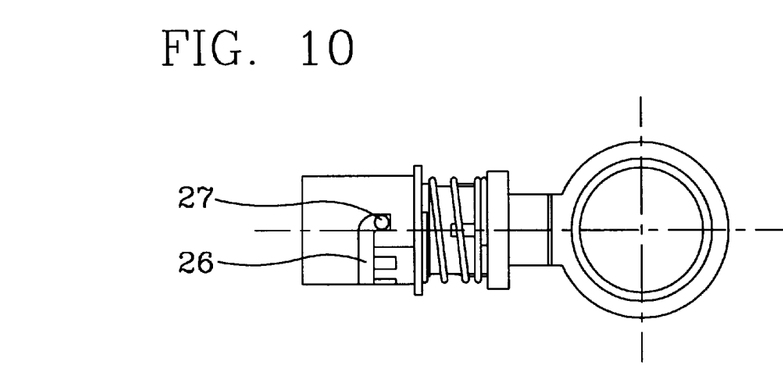
FIG. 10 shows the third embodiment with the cam riding along the control slot.
Figure 11:
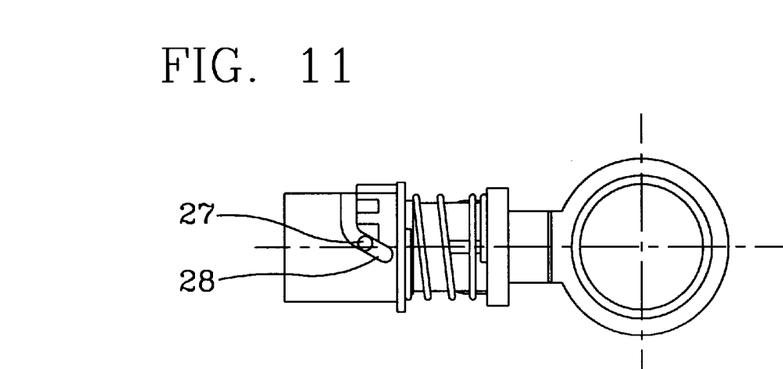
FIG. 11 sows the securing sleeve set in a park position.

FIGS. 9 through 11 show a variation of the adjusting device of FIGS. 5 through 8. In this design a compression spring 24 is inserted between the securing sleeve 17 and the annular shoulder 25 of the housing 10 of the adjusting device. A control slot 26 is present in the wall of the securing sleeve 17 and is engaged by a cam 27 radially projecting outward from the housing 10. The control slot 26 assumes a shape such that the securing sleeve 17 can be set in a park position as shown in FIG. 10, and, by rotating the securing sleeve 17, in a securing position as shown in FIG. 11. If the adjusting device or the cam 27 is in the park position, the push-pull rod 1 can be arbitrarily set, the spring 24 being stressed. By axially advancing and/or rotating the securing sleeve 17, the cam 27 moves out of the park position and, supported by the compression spring 24, automatically moves by means of the bevel of the control slot 26 shown in FIG. 11 into the securing position wherein it is kept by the spring 24. Thereby the push-pull rod 1 has been locked.

In still another variation of the invention shown in FIGS. 12 through 15, clamping is implemented by two conical clamping elements 18 pressed by a compression spring 19 mounted between the said clamping elements 18 into associated seats 20 when in the locked position. Illustratively rollers 21 are present at the conical clamping elements 18, though balls may also be used, to effect clamping and additionally centering and compensating tolerances. Moreover clamping may be implemented using a wedge, and affixation using an angle-lever tensioning system. The conical seats 20, the clamping elements 18 as well as the compression spring 19 are received in an outer, tubular housing 22. At least the cage-shaped seat for the clamping element 18 opposite the connector 6 and the two clamping elements 18 themselves comprise a preferably central borehole 9 to receive the push-pull rod 1.

Figure 12:
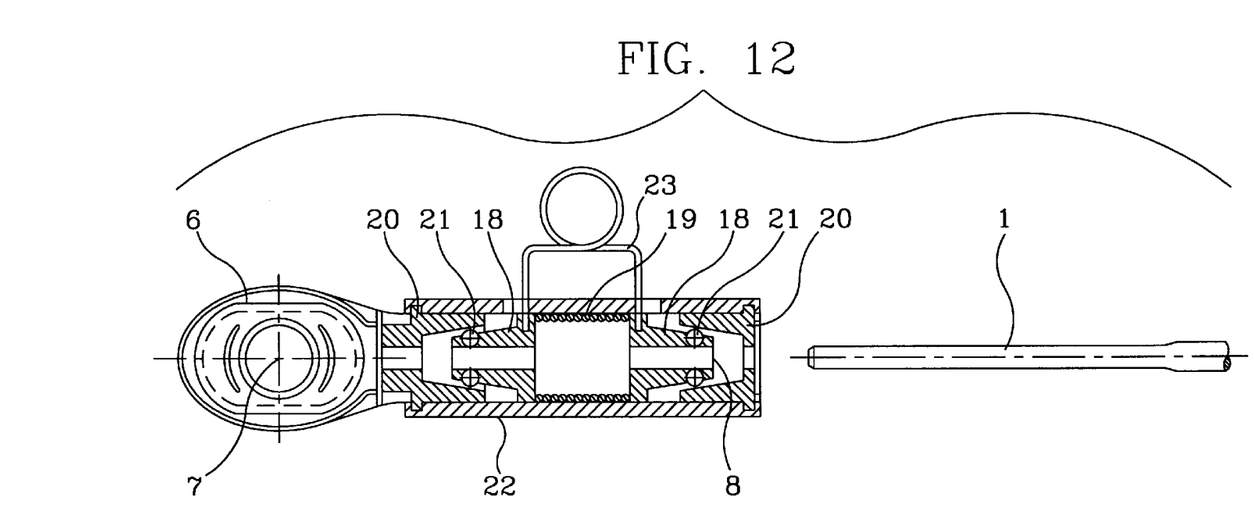
FIG. 12 shows a fourth embodiment of an adjusting device according to the present invention as the fourth embodiment is being assembled.
Figure 13:
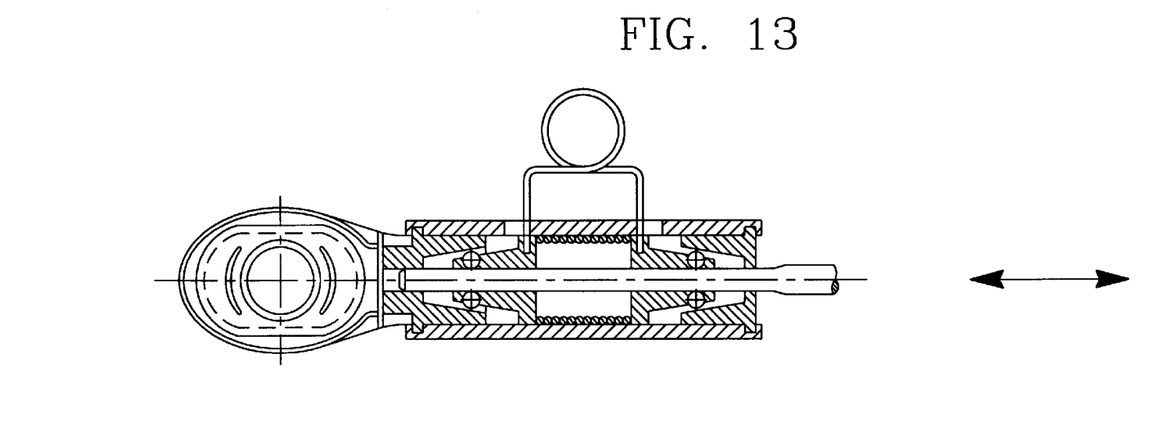
FIG. 13 shows the fourth embodiment of FIG. 12 with the push-pull rod inserted into the insertion duct.

FIG. 12 shows the delivery condition of the adjusting device separated from the push-pull rod 1. In this condition the two clamping elements 18 are disengaged from, i.e. the do not clamp, the seats 20 by the securing means 23. In such a condition it is possible to easily move the push-push rod 1 into the desired position in the housing 22 as shown by FIG. 13. Thereupon the securing means 23 is removed by being pulled out and the spring 19 moves the two clamping elements 18 into the clamping position relative to the seats 20. This condition (operational state) is shown in FIGS. 11 and 12.

Figure 14:
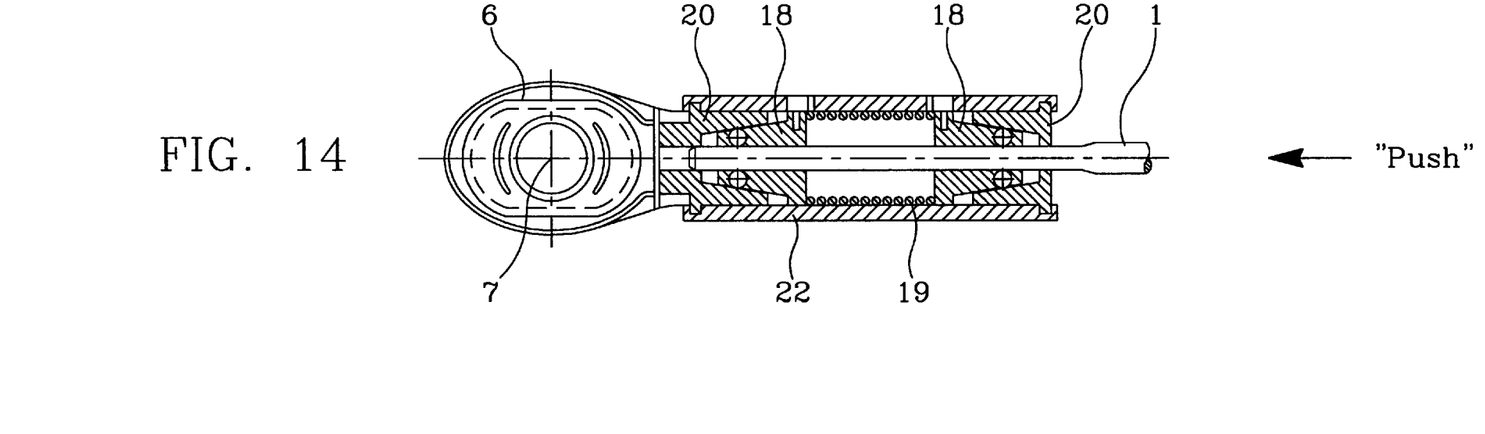
FIG. 14 shows the fourth embodiment of FIG. 12 with the push-pull rod being compressively loaded.

FIG. 14 shows the adjusting device under compressive load. The left clamping element 18 is forced specially hard into the conical seat and as a result still higher clamping of the push-pull rod is implemented by the rollers 21.

Figure 15:
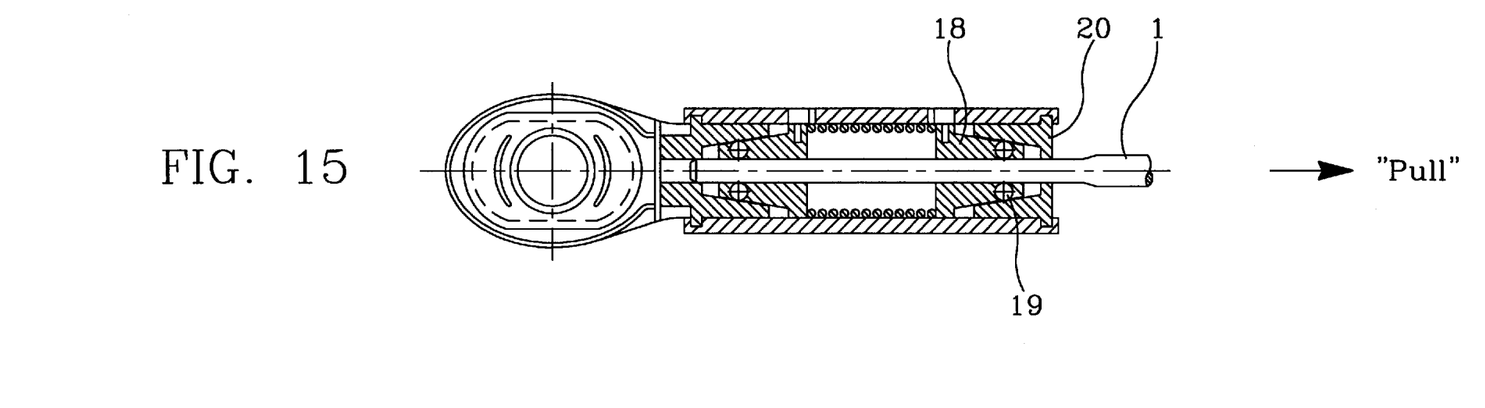
FIG. 15 shows the fourth embodiment of FIG. 12 with the push-pull rod being tensively loaded.

FIG. 15 shows the adjusting device of the invention being tensively loaded. The right-hand clamping element 18 is pressed into the associated seat 20 and by means of the rollers 21 increases clamping of the push-pull rod 1. The securing means 23 is disposable in this design, that is, it will be pulled only once, whereupon the adjusting device keeps the desired length setting. Even though not shown, it is also feasible to use a securing means that remains at the housing 22 and when actuated later again will compress the spring 19, as a result of which the drive means releases the push-pull rod 1 and then allows length readjustment.

Obviously the individual features of the above discussed embodiments may be interchanged or be kinematically reversed without thereby deviating from the concept of the invention. Illustratively FIGS. 8 through 15 show clamping elements having outer conical surfaces; it is equally feasible to use clamping elements having inner conical surfaces which then would be moved on external conical mating surfaces. The significant feature of the invention is that a spring shall always implement clamping between elements increasing or decreasing the diameter, said elements being conical or effective in some other way.

| PARTS LIST | |
|---|---|
| 1 | push-pull rod |
| 2 | setting screw |
| 3 | locking bush |
| 4 | spring |
| 5 | seat |
| 6 | connector |
| 7 | clearance |
| 8 | insertion duct |
| 9 | cage |
| 10 | housing |
| 11 | spring |
| 12 | spring |
| 13 | setting piece |
| 14 | clamping element |
| 15 | clamping element |
| 16 | ride-on bevel |
| 17 | securing sleeve |
| 18 | clamping element |
| 19 | spring |
| 20 | seat |

| -continued | |
|---|---|
| PARTS LIST | |
| 21 | roller |
| 22 | housing |
| 23 | securing means |
| 24 | spring |
| 25 | shoulder |
| 26 | control slot |
| 27 | cam |
| 28 | bevel |

What is claimed is:

1. An adjusting device for a push-pull rod in a vehicle for manual adjustment of length changes wherein the push-pull rod is selectively locked and unlocked by a setting element, wherein the setting element is a nut being rotatably positioned within said adjusting device; wherein said nut has an inside thread, wherein said push-pull rod has an outside thread, said outside thread cooperates with said inside thread, wherein said nut can be selectively locked and unlocked with respect to rotation by a locking bush, said locking bush being spring biased;

wherein said locking bush has an inside surface cooperating in the locking position with an outside surface of said nut, thereby clamping the nut in a locking position (with respect to rotation) and the inside surface of locking bush and the outside surface of setting nut comprise cooperating surfaces which prevent relative movement between said locking bush and said setting nut.

2. An adjusting device as claimed in claim 1, wherein the setting nut and the push-pull rod cooperate via none-self locking threads.

3. An adjusting device as claimed in claim 1, wherein the push-pull rod is supported in the adjusting device by rectilinear guides to prevent rotation of the push-pull rod.

* * * * *